(12) United States Patent
Nair

(10) Patent No.: US 9,785,404 B2
(45) Date of Patent: Oct. 10, 2017

(54) METHOD AND SYSTEM FOR ANALYZING DATA IN ARTIFACTS AND CREATING A MODIFIABLE DATA NETWORK

(71) Applicant: Infosys Limited, Bangalore (IN)

(72) Inventor: Sanal Kumar Sundaresan Nair, Thiruvananthapuram (IN)

(73) Assignee: Infosys Limited, Bangalore (IN)

( * ) Notice: Subject to any disclaimer, the term of this patent is extended or adjusted under 35 U.S.C. 154(b) by 77 days.

(21) Appl. No.: 13/900,437

(22) Filed: May 22, 2013

(65) Prior Publication Data
US 2013/0318104 A1    Nov. 28, 2013

(30) Foreign Application Priority Data

May 23, 2012   (IN) .......................... 2054/CHE/2012

(51) Int. Cl.
  *G06F 17/30*    (2006.01)
  *G06F 7/24*     (2006.01)
  *G06Q 10/04*    (2012.01)

(52) U.S. Cl.
  CPC ............... *G06F 7/24* (2013.01); *G06Q 10/04* (2013.01); *G06F 17/30598* (2013.01); *G06F 17/30604* (2013.01); *G06F 17/30707* (2013.01)

(58) Field of Classification Search
  None
  See application file for complete search history.

(56) References Cited

U.S. PATENT DOCUMENTS

| | | | |
|---|---|---|---|
| 7,194,483 B1 * | 3/2007 | Mohan et al. ................ | 707/600 |
| 7,849,049 B2 | 12/2010 | Langseth et al. | |
| 8,056,054 B2 | 11/2011 | Chen et al. | |
| 8,086,592 B2 | 12/2011 | Mion et al. | |
| 8,495,100 B2 * | 7/2013 | Cheung ........................ | 707/794 |
| 8,538,911 B2 * | 9/2013 | Kass et al. .................... | 707/602 |
| 2005/0038770 A1 | 2/2005 | Kuchinsky et al. | |
| 2007/0011175 A1 * | 1/2007 | Langseth et al. ............. | 707/100 |
| 2009/0327279 A1 * | 12/2009 | Adachi et al. .................... | 707/5 |
| 2010/0138197 A1 * | 6/2010 | Sher ................................ | 703/2 |
| 2011/0047389 A1 * | 2/2011 | Ginter et al. ................. | 713/194 |

OTHER PUBLICATIONS

"Oracle Business Intelligence Foundation Suite: Technical Overview," *Oracle*, Jan. 2011, 56 pages.

* cited by examiner

*Primary Examiner* — Dung K Chau
(74) *Attorney, Agent, or Firm* — Klarquist Sparkman, LLP

(57) ABSTRACT

Computer-implemented systems, methods, and computer-readable media for analyzing data in one or more artifacts and creating a modifiable data network includes: extracting the key elements from the one or more artifacts; identifying relationship among the key elements for each of the one or more artifacts; determining a first frequency of each of the key elements; determining a second frequency for each relationship among the key elements; creating a data network showing the key elements and the relationship among the key elements; and enabling a user to modify the data network based on one or more of: the key elements; the relationship among the key elements; the first frequency; and the second frequency.

18 Claims, 13 Drawing Sheets

Summarized Relationship information R200

| Relation | Start Keyword | End Keyword | Relationship Frequency |
|---|---|---|---|
| R1 | w1 | w2 | 2 |
| R2 | w1 | p1 | 2 |
| R3 | w1 | p2 | 2 |
| R4 | w2 | p1 | 2 |
| R5 | w2 | p2 | 3 |
| R6 | p1 | p2 | 2 |
| R7 | w2 | w3 | 1 |
| R8 | w2 | p3 | 3 |
| R9 | w3 | p2 | 1 |
| R10 | w3 | p3 | 1 |
| R11 | p2 | p3 | 2 |
| R12 | w1 | p3 | 1 |
| R24 | w4 | p5 | 1 |
| R25 | w4 | p6 | 1 |
| R26 | p5 | w4 | 1 |

R201

| Relation | Start Keyword | End Keyword | Relationship Frequency |
|---|---|---|---|
| R1 | w1 | w2 | 1 |
| R2 | w1 | p1 | 1 |
| R3 | w1 | p2 | 1 |
| R4 | w2 | p1 | 1 |
| R5 | w2 | p2 | 1 |
| R6 | p1 | p2 | 1 |

R204

| Relation | Start Keyword | End Keyword | Relationship Frequency |
|---|---|---|---|
| R24 | w4 | p5 | 1 |
| R25 | w4 | p6 | 1 |
| R26 | p5 | w4 | 1 |

FIG. 2C

METHOD AND SYSTEM FOR ANALYZING DATA IN ARTIFACTS AND CREATING A MODIFIABLE DATA NETWORK

BACKGROUND

The amount of data electronically recorded is steadily growing. The data may comprise of structured data (such as database records or xml data) or unstructured data (such as documents, books, media files and such). The data needs to be processed, transformed and abstracted into information so that enterprises could apply the knowledge gained from the data for their benefit. The process of extracting knowledge from data is called data mining.

Today data mining applies to almost all areas; be it banking, retail, healthcare, telecommunication, genetics etc. Data analysts use a variety of tools and techniques to extract, transform and comprehend gigabytes or terabytes of raw data from multiple sources. They transform the raw data into summary of information such as reports, anticipating discovery of previously unknown trends and facts.

Generally, every transaction recorded in raw data represents a fact, but at a much lower granular level than anticipated by a decision maker who wants to comprehend and act based on the facts. It is not practical for a human being to stay focused and consume a large amount of information in a timely manner and manually pick up the "prominent trends" leaving out less important facts. Hence the need of a convenient mechanism or tool arises that can abstract terabytes of data to a short summary report of a few kilobytes.

There are numerous statistical and non-statistical methods and tools available and used by today's data analyst for exploring and correlating the elements within data. The unstructured data analysis is relatively complex as compared to the structured data analysis because structured data can be easily indexed. Recent advancements in natural language processing techniques, statistical techniques etc. provide improved results in parts of speech tagging, extracting keywords from documents, face or object recognition in media files. These advancements set the stage for designing additional practical methods for further processing and summarizing of data which can make knowledge discovery from of unstructured data easier. For example, computational semantics process extracts the meaning representation from different types of texts.

Thus, a set of key elements can be mined from an artifact and is normally used for classification of the artifact, creating abstract at the artifact level as such. 'Key elements' are the elements associated with an artifact such as keywords/key phrases in text/audio/video files, face or object recognition in media files and the like. However, the key elements extracted from unstructured data does not include other parameters such as but not limited to, relationship between the key elements, frequency of the key-elements and the frequency of the relationship between the key elements. Without considering other parameters of the elements, users have limited options to modify the data network and perform efficient analysis based on the importance of the key elements.

Therefore, there is a need for an efficient knowledge discovery of both unstructured and structured data and to have a data network that can be modified based on different parameters like relationship between the key elements, frequency of the key-elements and the frequency of the relationship between the key elements. Thereby, enable the user to have a clear picture of the facts and their importance.

Improved systems and methods for analyzing data and creating modifiable data network are desired.

SUMMARY

The present disclosure discloses an embodiment for analyzing data in one or more artifacts and creating a modifiable data network. One or more key elements are extracted from the artifacts. The relationship among the key elements for each of the artifacts is identified. A first frequency of each of the one or more key elements and a second frequency for each relationship are determined. A data network showing the one or more key elements and the relationship among the one or more key elements is created and user is enabled to modify the data network based on one or more of: the key elements, the identified relationship, the first frequency, and the second frequency.

In one embodiment of the present disclosure, the user is further enabled to modify the coordinates of the key elements in the data network. Further, one or more artifacts can be selected from a plurality of artifacts.

In yet another embodiment of the present disclosure, the user is enabled to classify the key elements in one or more classes. Furthermore, the data network can be modified based on the one or more classes.

BRIEF DESCRIPTION OF THE DRAWINGS

FIGS. 2A-C illustrates the exemplary embodiment for processing of data in one or more artifacts.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings. While the invention described herein is provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof.

Figure 1:
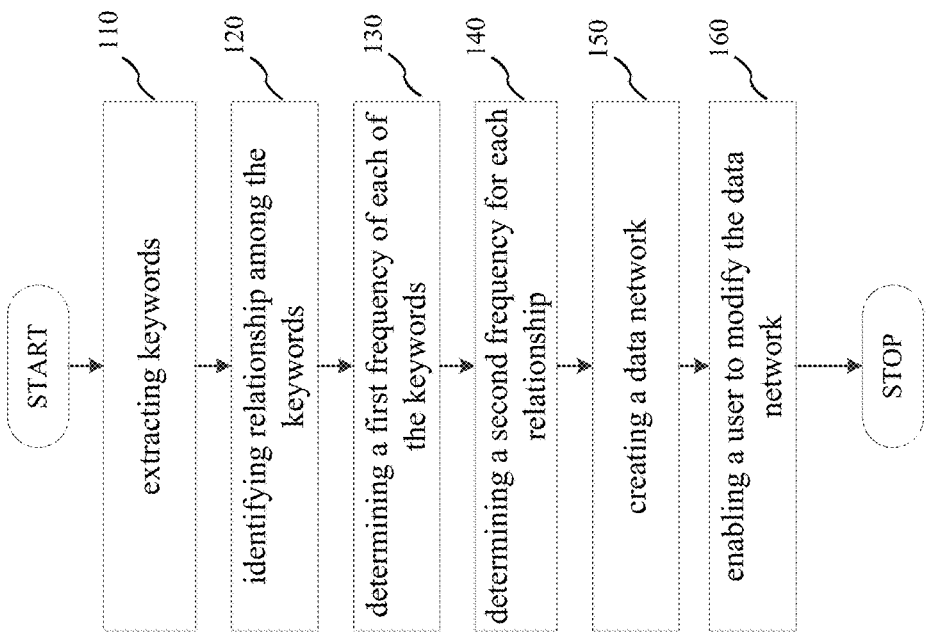
FIG. 1 is an illustrative diagram depicting the manner for analyzing data in one or more artifacts and creating a modifiable data network.

FIG. 1 is an illustrative diagram depicting the manner for analyzing data in one or more artifacts and creating a modifiable data network. Artifacts include, but are not limited to, website pages, documents, text files, audio files, video files, images, and the like. To extract information from the artifacts, the data in the artifacts are required to be processed. At step 110, a step in processing data is to extract the key elements from the artifacts. 'Key elements' are the elements associated with an artifact such as keywords/key phrases in text/audio/video files, face or object recognition in media files and the like. For example, extracting noun phrases from text documents using natural language processing techniques from a set of documents containing consumer comments can contain key elements like product name, consumer demographic information as such which is of importance to enterprises. In an example face recognition methods can be used for identifying human faces from a picture where the individual faces extracted can be considered as key elements extracted from the media file. Glancing through the key elements extracted from an artifact can help gather a high level understanding of the facts discussed in the artifact. As appreciated by a person skilled in the art, different techniques as known in the prior art may be used to extract key elements from artifacts.

At step 120, the relationships among extracted key elements are identified. The relationship between key elements herein refers to the occurrence of more than one key element together in a single artifact. Additionally, the relationship between key elements may depend on the proximities or sequence of occurrence of the key elements in an artifact, for example, the key elements used together in a line or a paragraph of the artifact. The key elements extracted from the single artifact may belong to different 'class or group' of facts. Two key elements being present together in an artifact indicate the possible relation between them given a context. For example a person "A" may record a new observation in a document that a specific symptom [say s1] started appearing in the context of a specific disease [d1]. For a second person "B" who is trying to consolidate the list of symptoms associated to disease d1 may find this fact interesting. Hence in addition to extracting keywords s1 and d1, identifying and recording the relationship s1-d1 is also important.

After the key elements have been extracted, at step 130, frequency of the key elements is determined. The frequency of the key element may be determined based on the occurrence of the key elements in the one or more artifacts. Additionally, the frequency of the key element may be determined based on the number of times the user of the artifacts have emphasized on a key element by either repeating/highlighting/liking it or in case of webpages, may be by clicking on the key element. Further, the frequency can be modified to come up with a revised frequency. These revisions could be through mathematical operations like multiplication, division, addition or subtraction by a factor. The factor may be determined by various parameters including but not limited to the pre-assigned factor associated with a specific key element. For example, an occurrence of a specific key element may carry a pre-defined factor 1 whereas the occurrence of a different word which is a synonym of the first one may be attached with a factor value (say) 5.

At step 140, frequency for each relationship among the key elements is determined. The frequency for each relationship may be determined based on the occurrence of a pair or key elements in one or more documents. The same or similar key elements repeating multiple times within or across artifacts indicate the importance of the fact represented by the word. Likewise, if a relationship between two key elements repeats multiple times, this indicates the importance of the fact or context represented by the relationship. Hence "frequency of the keywords" or "frequency of a relationship" or a combination of the same could play one of the most important roles in deciding whether a specific fact need to be considered as a prominent fact or not. For example this is particularly useful when organizations are reviewing large number of customer complaints or analyzing feedback forms to easily spot trends in user feedback and identify the high priority ones impacting most of the customer base. As discussed for the key element frequency, the relationship frequency also can be modified through mathematical operations through using one or more factors determined based on the context where the method is applied. For example, for a specific relationship like "bad habits" and "cancer" in a single artifact may carry a pre-defined factor of 1 whereas the relationship like "smoking" and "mouth cancer" may assigned a factor of 2 depending on the context the user wants to analyze the artifacts.

After the key elements, relationships and their respective frequencies have been determined, at step 150, a data network may be created showing the one or more key elements and the relationship among the one or more key elements. At step 160, the user may modify the data network based on one or more attributes of the data network such as the extracted key elements, the identified relationships, the determined frequency of the key elements, the frequency of the relationships or the different classes associated to the key elements. The modification of data network based on above noted factors may help the user to analyze the data from different aspects. In one embodiment, user may be enabled to modify one or more coordinates of the one or more key elements in the data network. Further, in another embodiment, user may select one or more artifacts from plurality of artifacts.

Figure 2A:
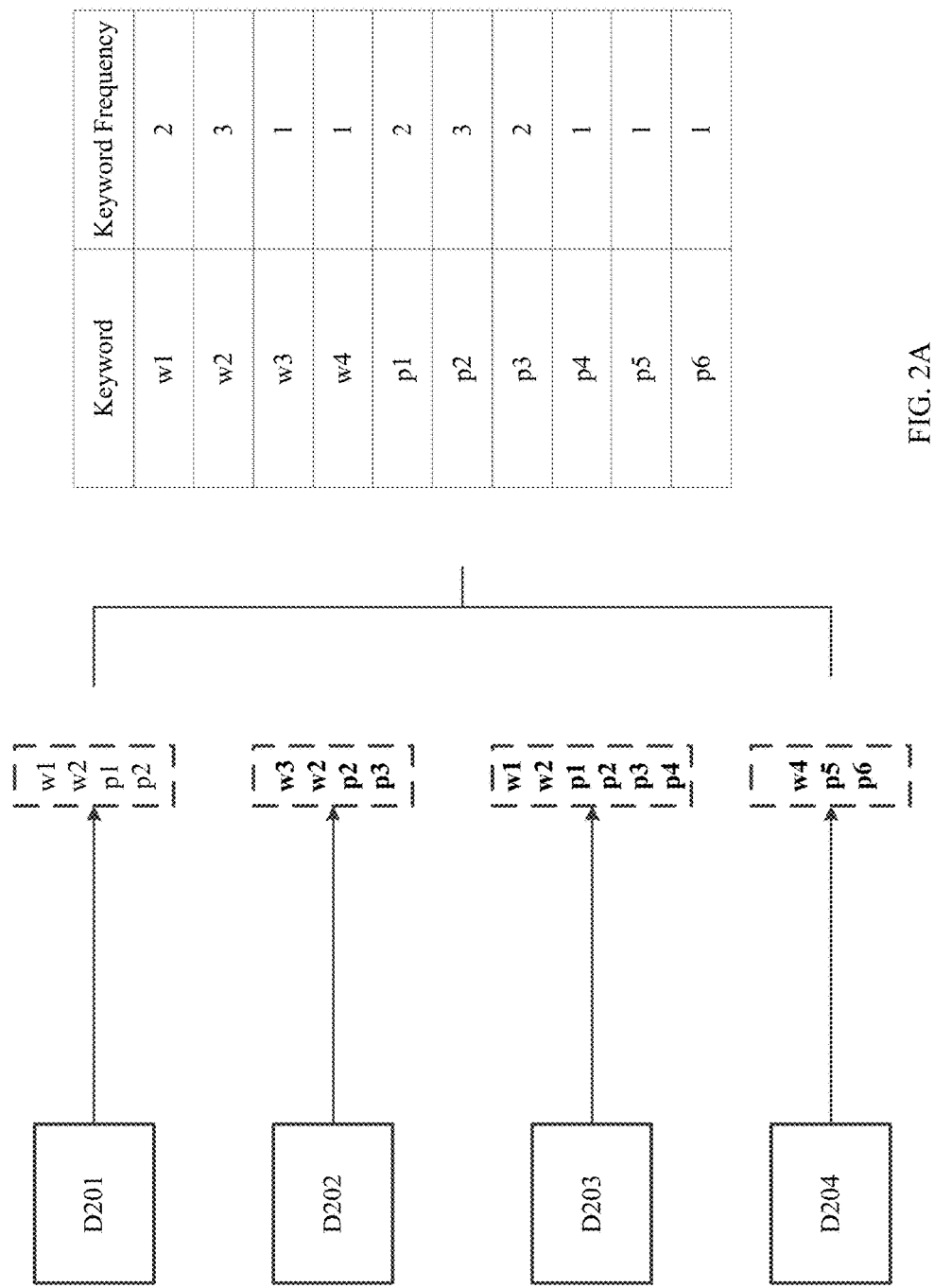
Figure 2B:
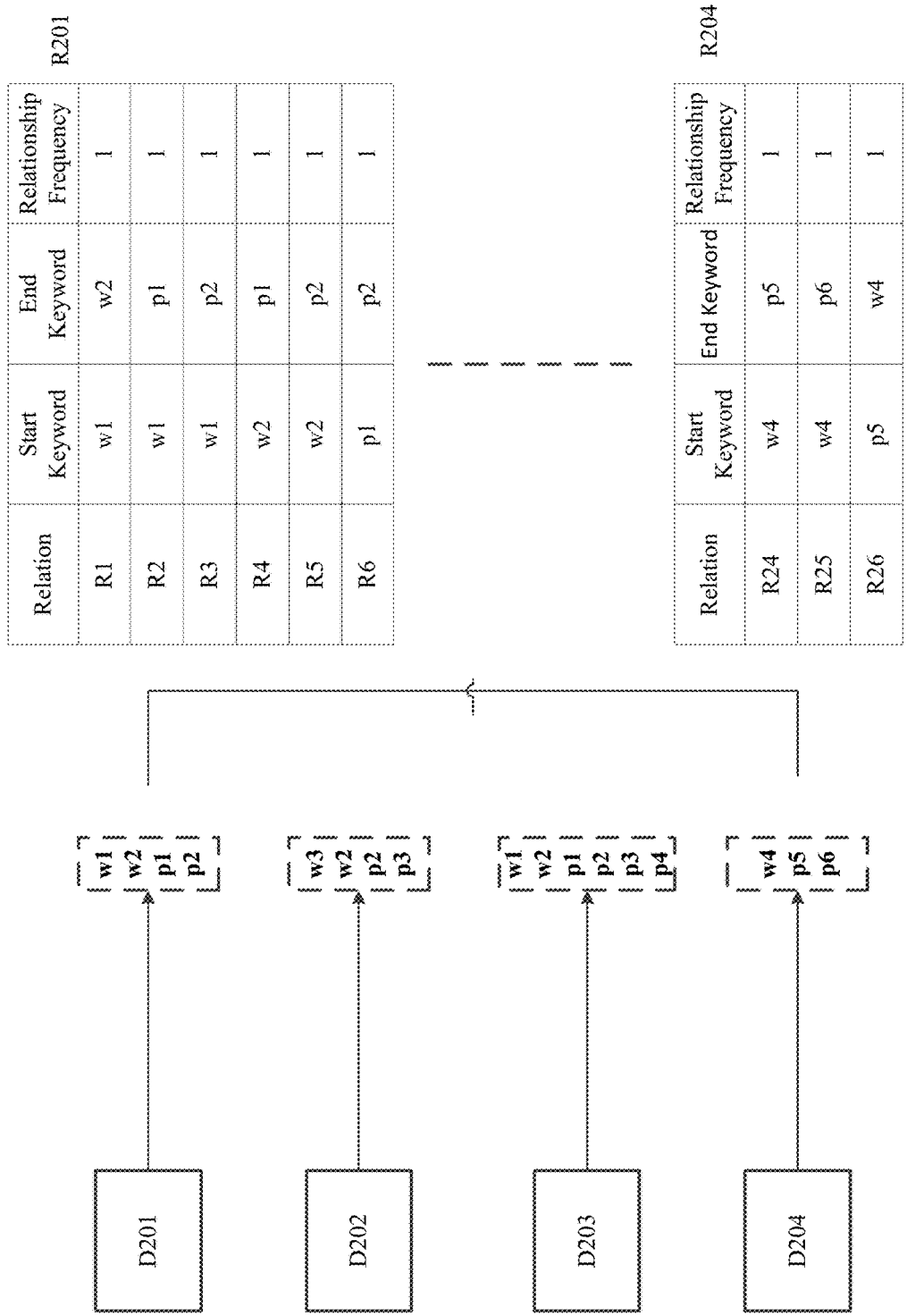

FIGS. 2A-C illustrates the exemplary embodiment for analyzing data in one or more artifacts. FIG. 2A shows artifacts D201, D202, D203, and D204 and the key elements w1, w2, p1, p2, w3, w4, p3, p4, p5, p6 extracted from the artifacts. The key elements may be extracted using any techniques known in the prior art. As appreciated by the person skilled in the art, it is possible to automatically extract key elements which may represent the basic characteristic of an artifact. For example, key elements w1, w2, p1, p2 are extracted from artifact D201, key elements w3, w2, p2, p3 are extracted from artifact D202 and so on. To determine the frequency of the key element, in one embodiment, the occurrence of the key element in all the documents can be counted to determine the frequency of the key element for example; w1 has occurred once each in artifact D201 and D203. Therefore, the frequency of key element w1 is the number of times w1 is repeated in artifacts and hence a frequency of 2. In another embodiment, the frequency of the key element may be determined by counting the occurrence of a key element along with the times the user has emphasized the key element may be by liking/highlighting the key elements or in any other way.

FIG. 2B illustrates artifacts D201, D202, D203, and D204 and the relationships R1, R2, R3, R4, R5, R6, R24, R25, R26 and their frequency. The other relationships and their frequencies related with D202 and D203 are not shown in FIG. 2B. After the key elements from each artifact have been extracted, the relationship between the key elements is identified. The relationship may be based on the occurrence of the key elements in single artifact or may also be based on the proximity of the key elements. In one embodiment, if the relationship is based on the occurrence of the key elements in single document then if w1 and w2 has occurred in artifact D201, then relationship between them is R1 otherwise, if the key elements w1 has occurred in D201 and w2 in D202, then there is no relation between them within the context of D201 and D202. In another embodiment, if the relationship is based on the proximity of the key elements such as the key elements should be in same paragraph of an artifact, then the relation between w1 and w2 is counted only if both w1 and w2 are in the same paragraph of an artifact. The relationship frequency may be determined based on the number of occurrence of the relation in a single artifact. As shown in FIG. 2B, frequency of R1 is 1 as the w1 and w2 have occurred together only once in D201.

FIG. 2C illustrates the summarization of relationship information. After the relationship of different key elements and their respective frequencies have been determined, the frequencies of the relationship may be added. For example, if R1 is a relation between w1 and w2 and the relation R1 has occurred in artifact D201 and D203 then the total frequency of the relation R1 is 2. The frequency of a relationship depicts the importance of the key elements used together. For example if a car name has been used very frequently with an oil company in multiple artifacts, this gives an inference that the car company might be using the oil from that oil company.

Figure 3:
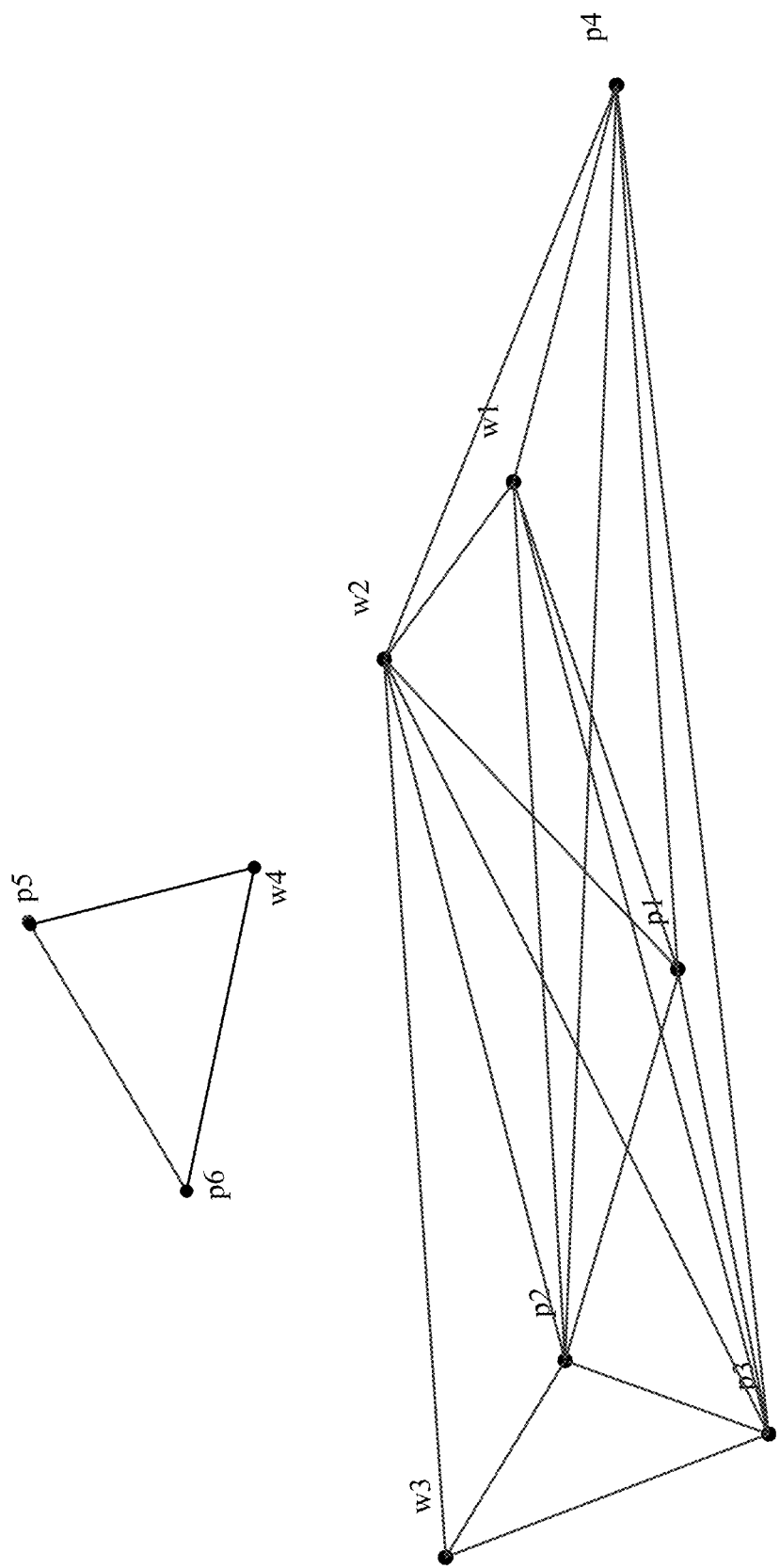
FIG. 3 shows an exemplary data network created after processing of data from one or more artifacts.

FIG. 3 shows an exemplary data network created after analyzing data from one or more artifacts. The data network shows the key elements w1, w2, w3, w4, p1, p2, p3, p4, p5, p6 and the relations between them. For example w3 has direct relation with w2, p2 and p3 and has no direct relation with w1 or p1, and no direct or indirect relation with w4, p5 or p6. This may indicate that w3 has been mentioned with w2, p2 and p3 in one or more than one artifacts. This data network gives a lot of information relating to the data but does not indicate the importance of the key elements and the relations of the key elements. Accordingly, the data network may be modified based on the key elements, relationships and their frequencies thereby, enabling the user to efficiently extract knowledge from the information provided by the data network.

Figure 4A:
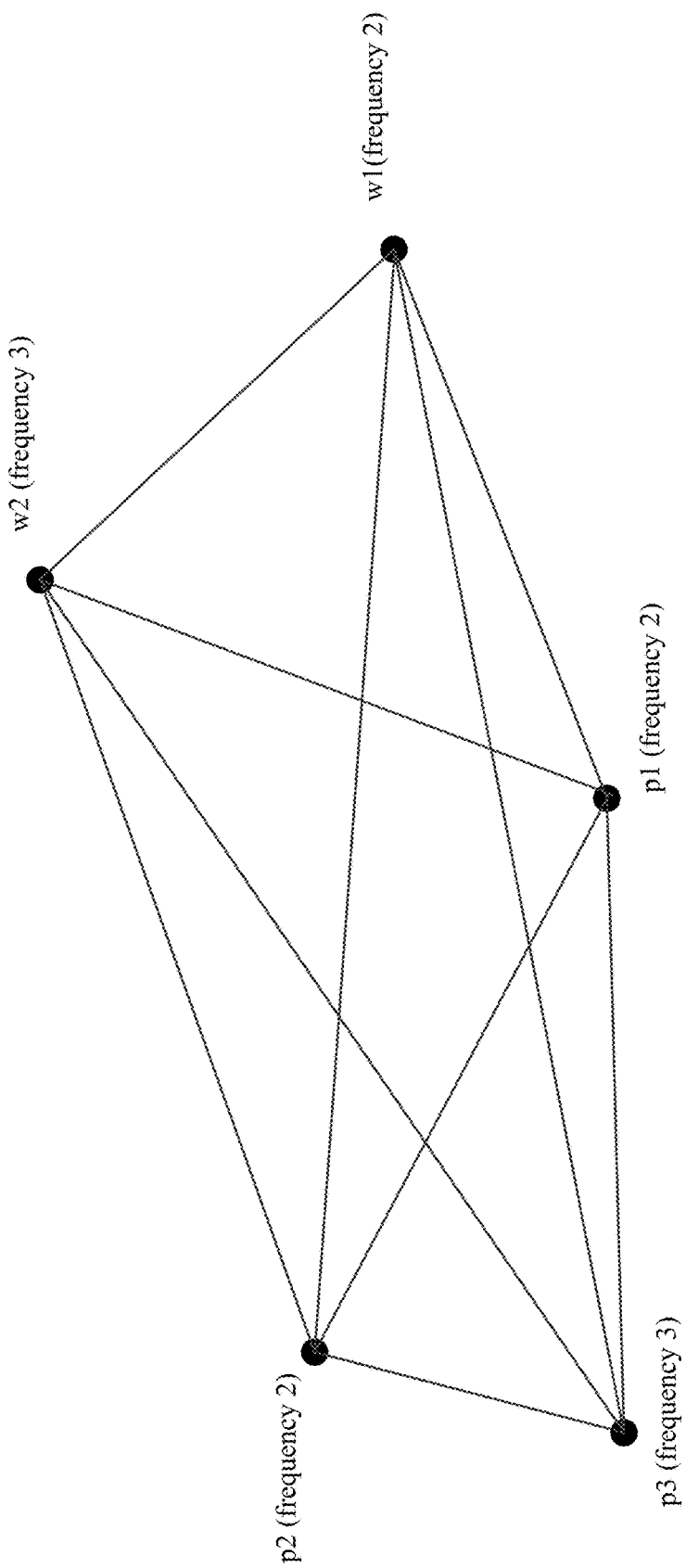
FIGS. 4A-B illustrates the exemplary embodiment of modified data network.
Figure 4B:
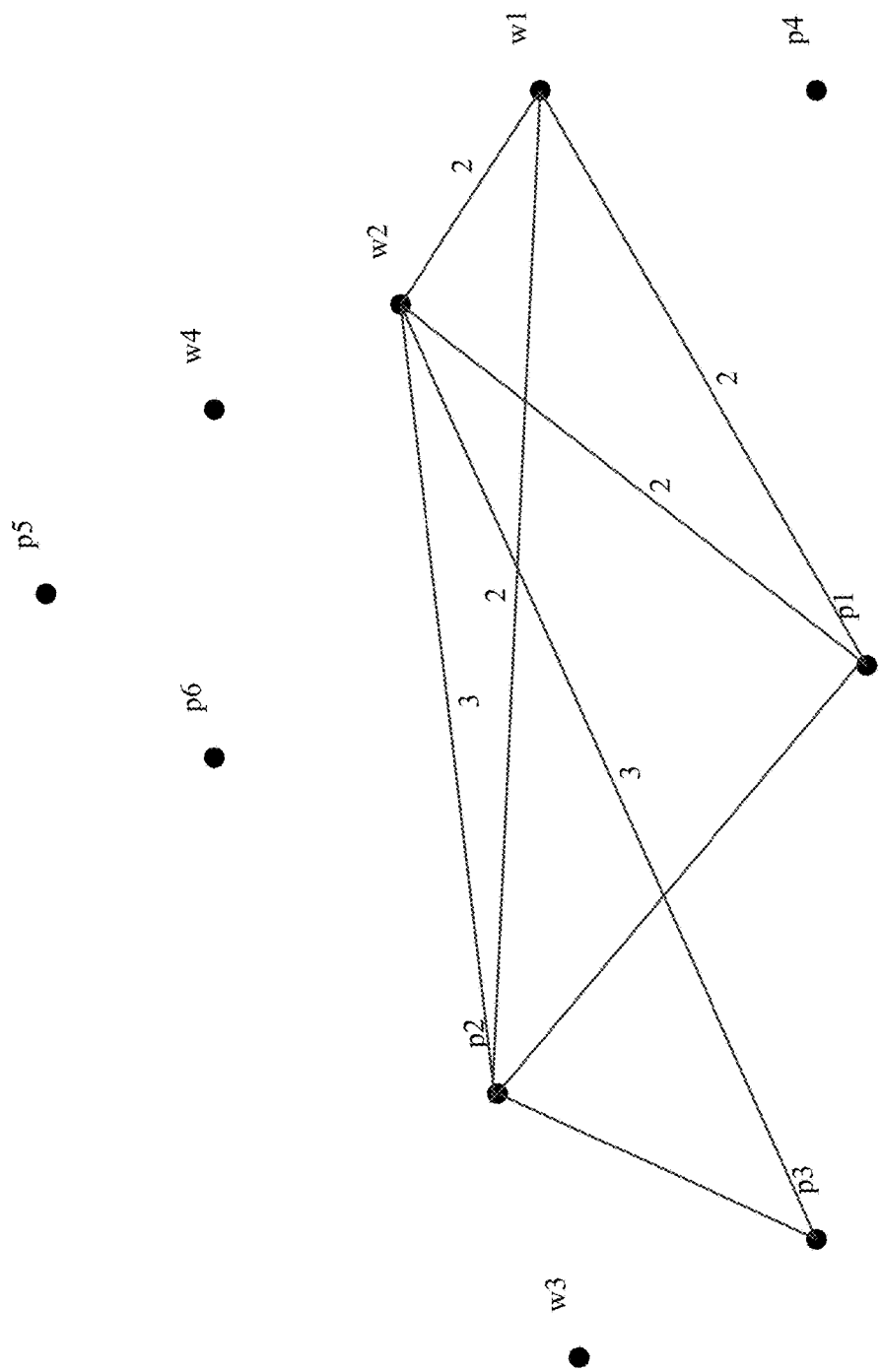

FIGS. 4A-B illustrates an exemplary embodiment of modified data network. The modification of the data network includes, but not limited to, deletion, addition, altering the key elements and/or relationships. The data network may be modified based on the key elements, relationships, frequency of the key elements, frequency of the relationship and/or the class the key element is related to.

In one embodiment, as shown in FIG. 4A, the data network has been modified based on the frequency of the key element (frequency of each key element is shown in FIG. 4A adjacent to the key element). FIG. 4A shows the data network with key elements having frequency more than 1 as per the frequency of the key elements shown in a table of FIG. 2A. For example, key element w2 has a frequency of 3. This enables the user to ignore the key elements of lesser importance.

In another embodiment, the data network has been modified based on the frequency of the relationship between the key elements. FIG. 4B shows the data network with key elements and their relations where the frequency of the relationship is more than 1 as per the frequency of the relationships shown in a table of FIG. 2C. In FIG. 4B, the relationship count has been shown between the key elements, for example, the relationship count between w2 and p2 is 3. Therefore, if w3 and p2 has been occurred in the artifacts only once, then the network will not show the relation between w3 and p2 as frequency of their relation is 1. This further simplifies the information presented and enables the user to extract knowledge out of this information efficiently.

Furthermore, if a user selects a key element, user can be provided with all the artifacts related with the key element. Moreover, in case the user selects a relationship in the data network, all the artifacts related with the relationship can be provided.

Figure 5A:
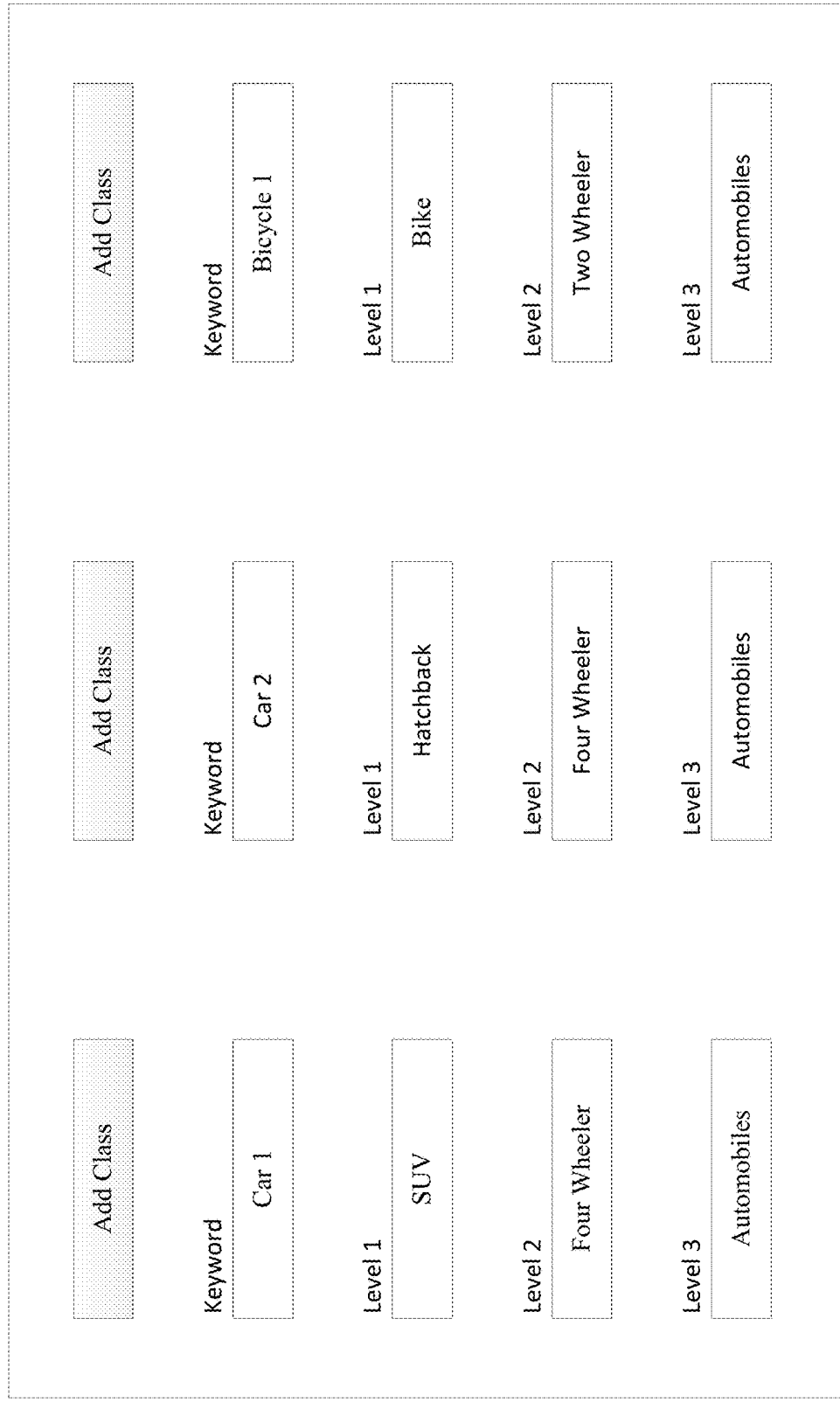
FIGS. 5A-5E illustrate exemplary embodiments for classifying key elements and using the classification for modifying the data network.

FIGS. 5A-5E illustrate exemplary embodiments for classifying key elements. The user can associate the key elements into different level of classes. As illustrated in FIG. 5A, key elements car1, car2 and bicycle1 have been classified for three levels of classes. Like car1 has been classified in level 1 as SUV, level 2 as Four Wheeler and level 3 as Automobiles. Likewise, car2 and bicycle have been classified. As appreciated by a person skilled in the art, the automatic or semiautomatic classification of key elements can be performed using processes known in the prior art.

Figure 5B:
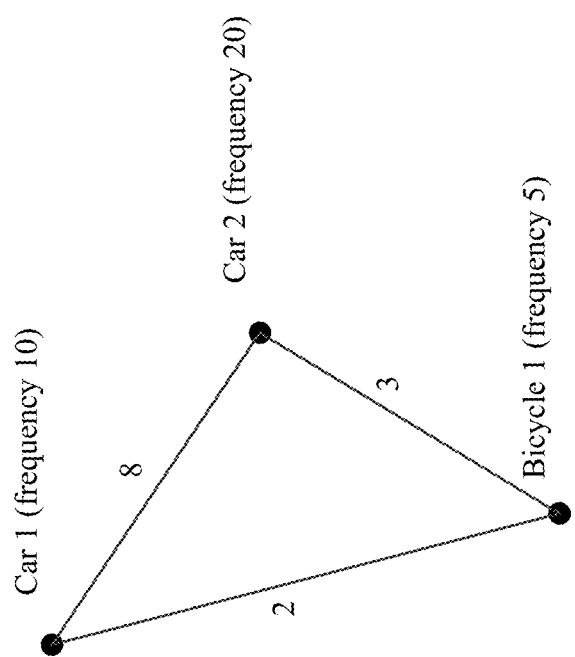

Accordingly, the data network can be further modified based on the different level of classes of the key elements. For the purpose of illustration and not limitation, reference is made to the representative embodiment of the modified data network shown in FIG. 5B-5D. As illustrated in FIG. 5B, the user can analyze the key elements car1, car2 and bicycle1 where the frequencies of the key elements are 10, 20 and 5 respectively. Also shown in FIG. 5B are the relationship frequencies between the key elements as 8 for car1-car 2, 3 for car2-bicycle1 and 2 for bicycle1 and car1. This data network along with key element frequency and relationship frequency helps understand the facts, relationship between facts and their relative priority at the individual product level.

Figure 5C:
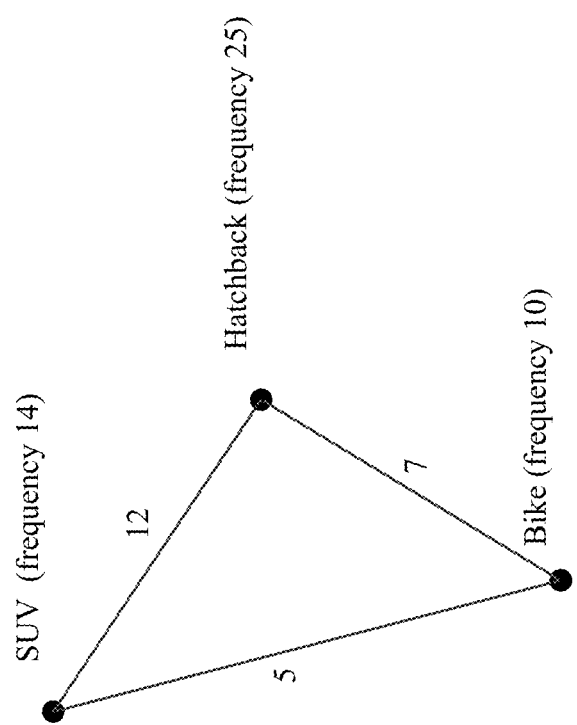

FIG. 5C refers to a modified data network based on the level 1 classification of key elements as shown in FIG. 5A. Car1 comes under the class of SUV. It will be appreciated that the artifacts selected by the user for analysis may refer to other vehicles which can be classified as SUV. Hence, the frequency of SUV as shown in FIG. 5C is 14 (more than the frequency of car 1). Similarly, the frequencies of Hatchback and bike are 25 and 10 respectively. This indicates that if the analysis is required to be performed at higher level, the data network can be modified based on the different level of the class associated to the key element extracted at different levels. Based on this data analysis, reports can also be generated. As shown in FIG. 5E, the graph indicates the frequency of the SUV, Hatchback and bike. Similarly, the reports or graphs can be provided at different classification level.

Figure 5D:
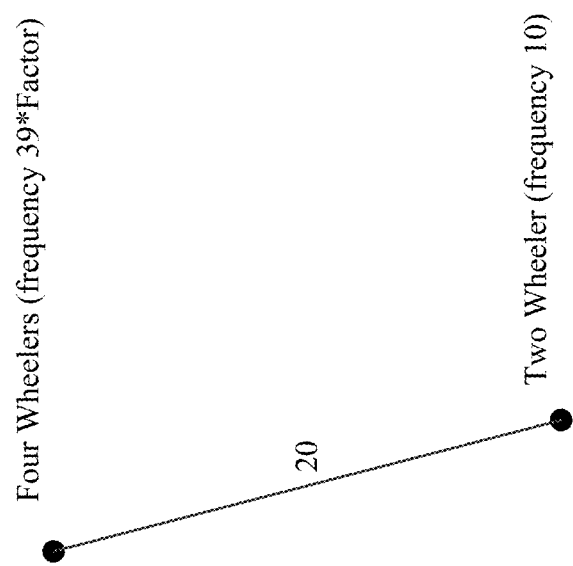
Figure 5E:
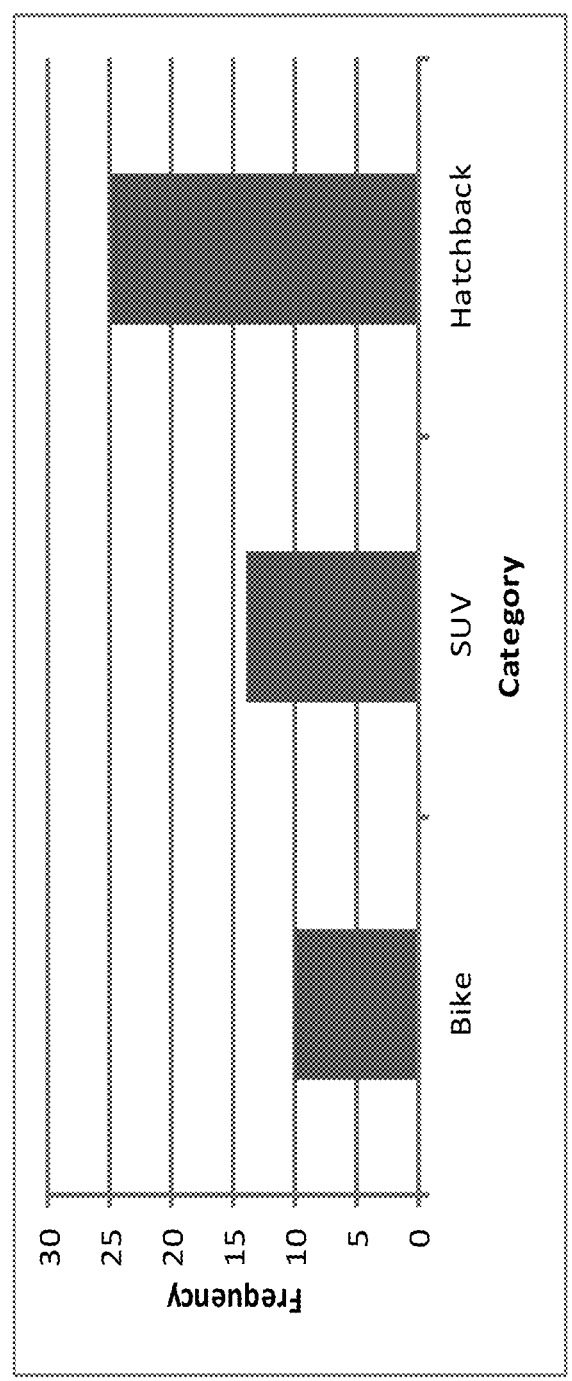

FIG. 5D shows the data network at level 2 classification (i.e. 4 wheelers and 2 wheelers) of the key elements (car1, car2 and bicycle1). In one simple illustration, at any level, the frequency of the key element can be the sum of the frequency of the nodes under the same and the frequency of the relationship can be the sum of the frequency of the relationships. For example when the network diagram is viewed at level 2, SUV with frequency 14 and Hatchback with frequency 25 rolls up to the level 2 key element '4 wheeler' and hence the frequency of '4 wheeler' can be 39. For the purpose of illustration, the frequency of Four Wheeler has been shown as 39*factor. "*" can be replaced with any mathematical operator and "factor" may be any pre-assigned number assigned to a key element/class. The factor may be determined by various parameters including but not limited to the pre-assigned factor associated with a specific key element/class. The frequency of relationship among the two classes has been shown as 20. This may indicate that the two Wheeler and Four Wheeler have been associated together 20 times in various artifacts through the key elements rolling up to these. Additionally, a factor can be applied to the frequency of the relationship too. Modifying data network at different level of classes helps the user to have an over view of the broad as well as narrow topics discussed in different artifacts.

Exemplary Computing Environment

Figure 6:
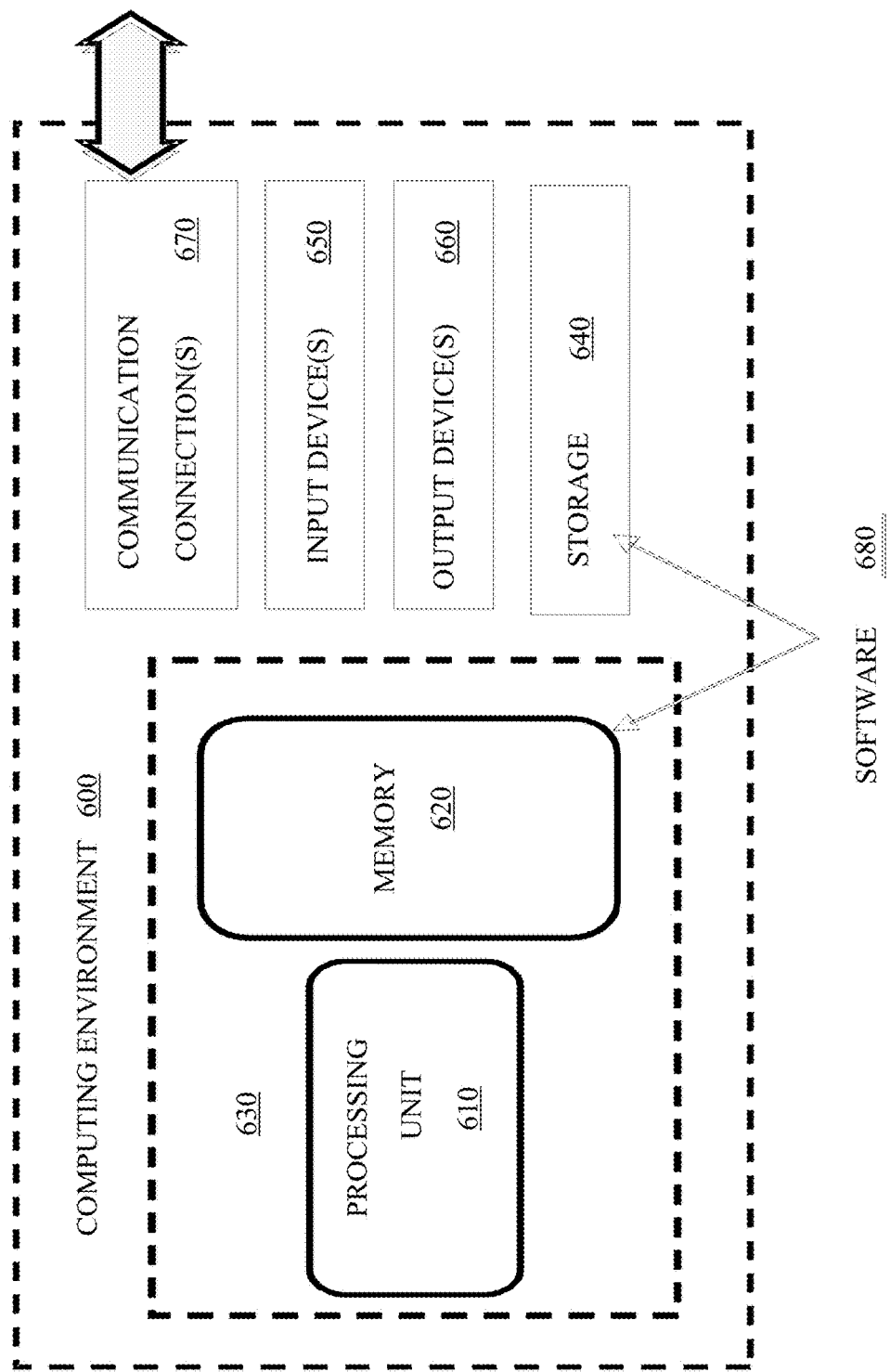
FIG. 6 is a system illustrating a generalized computer network arrangement, in one embodiment of the present technique.

One or more of the above-described techniques may be implemented in or involve one or more computer systems. FIG. 6 illustrates a generalized example of a computing environment 600. The computing environment 600 is not intended to suggest any limitation as to scope of use or functionality of described embodiments.

With reference to FIG. 6, the computing environment 600 includes at least one processing unit 610 and memory 620. In FIG. 6, this most basic configuration 630 is included within a dashed line. The processing unit 610 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. In some embodiments, the memory 620 stores software 680 implementing described techniques.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which may be used to store information and which may be accessed within the computing environment 600. In some embodiments, the storage 640 stores instructions for the software 1080.

The input device(s) 650 may be a touch input device such as a keyboard, mouse, pen, trackball, touch screen, or game controller, a voice input device, a scanning device, a digital camera, or another device that provides input to the computing environment 600. The output device(s) 660 may be a display, printer, speaker, or another device that provides output from the computing environment 600.

The communication connection(s) 670 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 600, computer-readable media include memory 620, storage 640, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A computer implemented method executed by one or more computing devices for analyzing data in one or more artifacts and creating a modifiable data network, the method comprising:

extracting a plurality of key elements from the one or more artifacts;

identifying a first relationship among at least two of the extracted plurality of key elements for each of the one or more artifacts;

determining a first frequency of each of the plurality of key elements, wherein the first frequency is based on a number of occurrences of each of the extracted plurality of key elements in the one or more artifacts;

determining a second frequency for each first relationship, wherein the second frequency is based on a number of occurrences of the at least two key elements in the one or more artifacts;

creating a data network showing the plurality of key elements and the first relationship;

receiving user input assigning at least a portion of the plurality of key elements extracted from the one or more artifacts into one or more classes by associating a textual tag provided by the user for each of the one or more classes to each key element of the at least a portion of the plurality of key elements;

calculating a third frequency of each of the one or more classes, wherein the third frequency is based on a number of occurrences of each of the plurality of extracted key elements in the one or more artifacts assigned to a respective class of the one or more classes;

identifying a second relationship between a first class of the one or more classes and at least one of a second class of the one or more classes and one or more of the plurality of extracted key elements;

determining a fourth frequency for each second relationship between a first class of the one or more classes and at least one of a second class of the one or more classes and the one or more of the plurality of extracted key elements, wherein the fourth frequency is based on a number of occurrences of the first class and the second class or each of the one or more of the plurality of extracted key elements in the one or more artifacts; and creating a modified data network based at least in part on the classified at least a portion of the plurality of key elements and the third frequency and the fourth frequency of at least one class of the one or more classes.

2. The method of claim 1, wherein receiving user input assigning at least a portion of the key elements extracted from the one or more artifacts into one or more classes comprises associating a textual tag with each key element of the at least a portion of the key elements for each of a plurality of classes.

3. The method of claim 2, wherein the plurality of classes are hierarchically organized.

4. The method of claim 1, further comprising:
receiving user input selecting a first class of the plurality of classes;
wherein, for creating a modified data network, the at least one class of the one or more classes comprises the first class and the third and fourth frequency are associated with the first class.

5. The method of claim 1, further comprising:
receiving user input selecting a first class of the plurality of classes, wherein, for creating a modified data network, the at least one class of the one or more classes comprises the first class and the third and fourth frequency are associated with the first class;
receiving user input selecting a second class of the plurality of classes; and
creating a modified data network based at least in part on the classified at least a portion of the key elements and the third frequency and the fourth frequency of the second class.

6. The method of claim 1, wherein associating a textual tag provided by a user for each of the one or more classes to each key element of the at least a portion of the key elements comprises assigning the same tag to at least first and second key elements of the at least a portion of key elements, the first and second key elements being different from one another.

7. The method of claim 1, wherein identifying a relationship among at least two of the extracted key elements comprises determining that the at least two of the extracted key elements occur within a set proximity of one another within an artifact of the one or more artifacts.

8. The method of claim 7, wherein the set proximity comprises the two key elements being located within the same paragraph or the same line of the artifact of the one or more artifacts.

9. The method of claim 1, wherein identifying a relationship among at least two of the extracted key elements comprises determining that the at least two of the extracted key elements occur in a specified sequence in an artifact of the one or more artifacts.

10. A system for analyzing data in one or more artifacts, the system comprising:
one or more processors operatively coupled to a memory, the one or more processors configured to perform the steps of:
extracting a plurality of key elements from the one or more artifacts;
identifying relationships among the plurality of key elements for each of the one or more artifacts;
determining a first frequency of each of the plurality of key elements, the first frequency corresponding to a number of times a respective key element appears in the one or more artifacts;
determining a second frequency for each relationship among the plurality of key elements, wherein the second frequency is based on a number of occurrences of the key elements in a respective relationship in the one or more artifacts;
determining a third frequency for at least one of the plurality of key elements by applying a mathematical operation to the first or second frequency and a value of a factor;
wherein the mathematical operation comprises one or more of multiplication, division, addition, or subtraction;
receive user input specifying the mathematical operation, the value of the factor, and whether the third frequency is calculated using the first frequency or the second frequency;
creating a data network showing the plurality of key elements and relationships among the plurality of key elements based at least in part on the third frequency; and
the memory configured to:
store the plurality of key elements, relationships among the plurality of key elements, the first frequency, the second frequency, and the third frequency.

11. The system of claim 10, wherein the factor is a predefined factor specified for the at least one of the plurality of key elements.

12. The system of claim 10, wherein at least a first key element is associated with a first factor having a first value and at least a second key element of the plurality of key elements is associated with a second factor having a second value, the first value being different than the second value.

13. The system of claim 10, wherein determining the third frequency comprises applying the mathematical operation to the first frequency.

14. The system of claim 10, wherein determining the third frequency comprises applying the mathematical operation to the second frequency.

15. The system of claim 10, wherein determining the third frequency comprises applying the mathematical operation to the first frequency, the mathematical operation is a first mathematical operation, the factor is a first factor, and the one or more processors are configured to perform the steps of:
determining a fourth frequency for at least one of the plurality of key elements by applying a second mathematical operation to the second frequency and a value of a second factor.

16. A computer program product comprising a non-transitory computer usable medium having a computer readable program code embodied therein for causing a computing system to perform processing to analyze data in one or more artifacts and create a modifiable data network, the processing comprising:
extracting a plurality of key elements from the one or more artifacts;
identifying relationships among the plurality of key elements for each of the one or more artifacts;
determining a first frequency of each of the plurality of key elements, the first frequency corresponding to a number of times a respective key element appears in the one or more artifacts;
determining a second frequency for each relationship among the one or more key elements, wherein the second frequency is based on a number of occurrences of the key elements associated with the respective relationship in the one or more artifacts;
determining a number of times at least one of the plurality of key elements was emphasized by a user of an artifact of the one or more artifacts;
determining a third frequency, the third frequency being a sum of the number of times the at least one of the plurality of key elements was emphasized by a user and the first frequency associated with the at least one of the plurality of key elements; and creating a data network showing the plurality of key elements and relationships among the plurality of key elements, the creating based at least in part on the second and third frequencies.

17. The computer program product of claim 16, wherein determining a number of times at least one of the plurality of key elements was emphasized by a user comprises determining a number of times the key element of the plurality of key elements was selected by the user.

18. The computer program product of claim 17, wherein a number of times the key element was selected by the user comprises a number of times the key element was clicked on by a user.

* * * * *